(12) United States Patent
Burdick

(10) Patent No.: US 7,077,162 B2
(45) Date of Patent: Jul. 18, 2006

(54) VALVING MEANS FOR REDUCING HOSE LINE PRESSURE DURING DISCONNECT

(76) Inventor: Al Burdick, 854 Hugo Reid Dr., Arcadia, CA (US) 91007

( * ) Notice: Subject to any disclaimer, the term of this patent is extended or adjusted under 35 U.S.C. 154(b) by 266 days.

(21) Appl. No.: 10/866,899

(22) Filed: Jun. 15, 2004

(65) Prior Publication Data
US 2005/0274831 A1 Dec. 15, 2005

(51) Int. Cl.
F16K 17/04 (2006.01)

(52) U.S. Cl. .................. 137/881; 251/90; 251/114; 251/339

(58) Field of Classification Search ............... 137/881; 251/90, 339
See application file for complete search history.

(56) References Cited

U.S. PATENT DOCUMENTS 4,078,728 A * 3/1978 Nordeen ................. 137/881
5,289,850 A * 3/1994 Sarson et al. ............ 137/614
5,364,070 A * 11/1994 Crow ........................ 251/322
5,487,493 A * 1/1996 McNabb ................. 222/153.14
5,813,574 A * 9/1998 McNabb .................. 222/146.6
6,269,840 B1 * 8/2001 Beaver ..................... 137/637.4
6,328,069 B1 * 12/2001 Schumann et al. ......... 137/881
6,386,235 B1 * 5/2002 McCulloh et al. ......... 137/881
6,957,667 B1 * 10/2005 Huang ...................... 137/881

* cited by examiner

Primary Examiner—Eric Keasel
Assistant Examiner—Cloud Lee
(74) Attorney, Agent, or Firm—Robert J. Lauson, Esq.; Lauson & Associates

(57) ABSTRACT

The relief valve assembly (10) includes a tube (24) having a circular threaded portion (30) adjacent a first end (28) that rotatbly receives an interconnection means. The tube other end has male threads (34) for connection to a water-use point. A valving means actuator (46) has a tapered head (50) which can be manually operated to be located in blocking or unblocking relation within an opening (44) in the tube (26) for selectively emitting liquid to the ambient and reducing internal tube water pressure. A system lock (57) enables selective locking or unlocking of the relief valve assembly (10) as desired.

3 Claims, 2 Drawing Sheets

VALVING MEANS FOR REDUCING HOSE LINE PRESSURE DURING DISCONNECT

BACKGROUND

1. Background of the Invention

The present invention relates generally to a hydraulic hose line that is frequently attached and detached between a source of pressurized water and water use connection, and, more particularly, to a manually operated relief valve means readily interconnectable between the hose line and the water use connection for operating to reduce line water pressure attendant hose disconnection to prevent random exit spurting of water at that time occasioned by internal hose water pressure.

2. Discussion of Related Art

There are many situations where pressurized water is conveyed by hose from a pressurized source to a use point and connections at both hose ends are manually effected by twisting on and off, as the case may be, through the assistance of male and female connectors. A typical situation of this kind is the provision of pressurized water to a recreational vehicle (RV) which will have to be connected and disconnected many times as the vehicle owners move from campground to campground.

An unpleasant occurrence at each hose disconnection from the vehicle is that despite taking considerable care, on releasing the hose from the vehicle connector the residual water pressure causes outward spurting that can get all over the individual making the disconnection and adjacent regional parts. If foresight is not taken, such water spurting can damage packed clothing and equipment that is standing adjacent the vehicle water connection means being disconnected.

SUMMARY OF THE INVENTION

In the practice of the present invention there is provided a short tubular member terminating at its ends in, respective, male threads on the one member end for connection to the water-use point. The other member end includes a recessed circular groove dimensioned to receive a cylindrical bib in rotable relation. The bib includes female threads interconnecting with the water providing hose. A relief valving means is mounted within the tubular member including a transversely extending actuator which on being operated releases internal pressurized water to be directed outwardly in a preferred safe direction such that it causes no harm, damage or mess.

BRIEF DESCRIPTION OF THE DRAWINGS

These and other objects and advantages of the present invention will become more readily apparent upon reference to the following detailed description and upon reviewing the attached drawings, in which.

DESCRIPTION OF A PREFERRED EMBODIMENT

Figure 1:
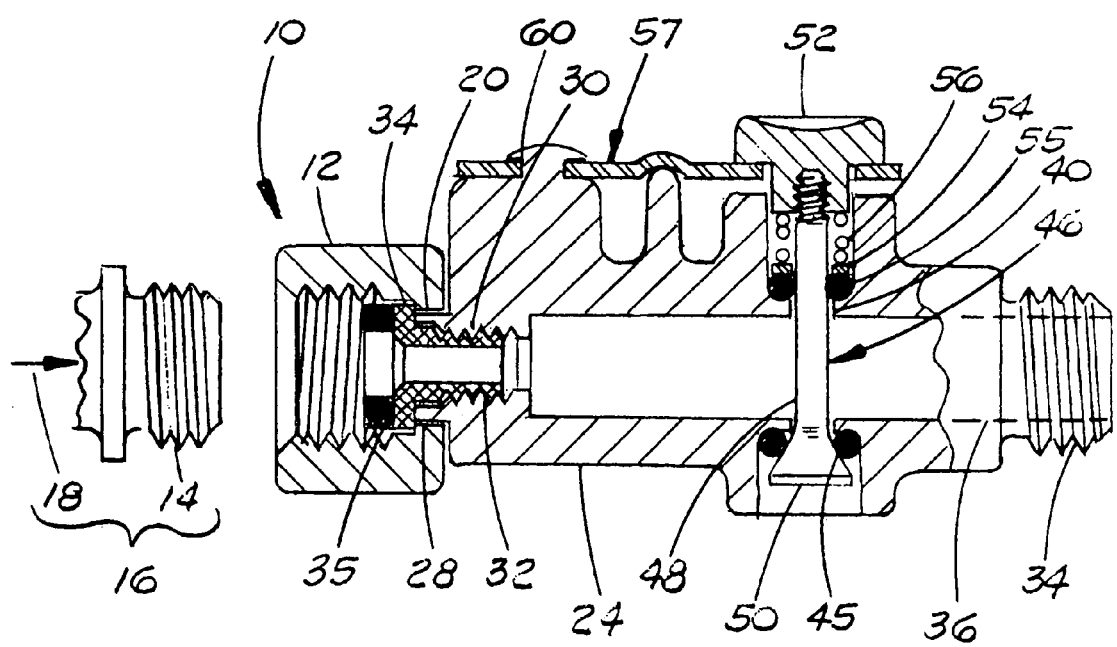
FIG. 1 is an elevational, partially sectional view of the water supply relief valve assembly of the present invention.

Turning now to the drawings and particularly FIG. 1, the water supply relief valve assembly 10 of the present invention includes a female threaded cylindrical interconnection means 12 for threaded receipt of the male threaded end 14 of a pipe or hose 16 providing a source of supply of pressurized water flowing in the direction of the arrow 18. The interconnection means 12 also includes a rear flange wall 20 with a central opening 22 for a use and purpose to be given later.

The valve housing 24 generally consists of a hollow, open-ended, cylindrical tube preferably constructed of plastic (e.g., polyurethane), or other rigid and durable material. A first open end 28 of the housing includes an inner reduced diameter threaded portion 30 which is adapted to receive a threaded stub connector 32 therein with an enlarged head 34 facing along the centerline of the interconnection means 12. A rubber washer 35 abuts against the enlarged head 34 to seal against water leakage therepast. The overall configuration and dimensions of the open end 28 parts just described are such that when properly assembled to the interconnection means 12 as will be described, the means 12 is rotatably secured to the first open end 28 of the housing 24.

The second open end 36 of the tube 24 has a male thread 34 formed thereon for fitting engagement with a complementary threaded supply line (not shown) that is conventionally interconnects with a water use location (not shown) such as a recreational vehicle, for example.

Intermediate the first and second open ends of the valve housing tube 24, there is a first opening 40 formed in the tube sidewall having a first relatively small diameter as it opens to the tube interior cavity and a relatively large diameter portion that opens to the exterior of the tube. The internal wall of the large diameter opening is radiused for receiving a flexible and resilient O-ring 55 therein.

Directly opposite the first opening 40 and having its centerline collinear with that of the first opening, there is formed a exit opening 44 which terminates in an O-ring 45.

An actuator 46 includes a central cylindrical rod portion 48 that terminates at one end in a tapered head 50 dimensioned for fitting receipt within the tapered opening 44. The opposite end of the actuator terminates in an enlarged cylindrical head 52 threaded thereon.

Assembly of the actuator 46 to the tube 24 is accomplished by sliding the rod portion 48 through the tapered opening 44 and then the first opening 36 until the tapered head fits into the tapered opening 44 and the opposite end of the rod portion extends outwardly of the first opening 40. Next, a washer 54 having a width dimension enabling fitting receipt onto the rod portion 48 is slid down onto an O-ring 55 at the bottom of opening 40. Finally, a coil spring 56 is placed on the outer end portion of the rod portion and the enlarged head 52 is threaded onto the end of the rod portion. As assembled, the coil spring biases the tapered head into closed relation within the tapered opening 44, and also seals both O-rings to the rod portion 48 and the tapered opening 44.

In normal use, pressurized water from conventional sources moves unimpeded in the direction of the arrow 18 through the valve housing tube 24 to the point of ultimate use (e.g., a recreational vehicle). When it is desired to totally disconnect the pressurized water source, first the water source is turned off by conventional means (e.g., hose connection at source). Next, the enlarged head 52 on the actuator 46 is depressed which allows any remaining pressurized water within the tube 24 to empty to the ambient solely via the tapered opening 44 rather than as an uncontrolled stream creating mess or damage. Finally, with the internal liquid pressure substantially dissipated, the relief valve assembly 10 can be removed and stored.

Figure 2:
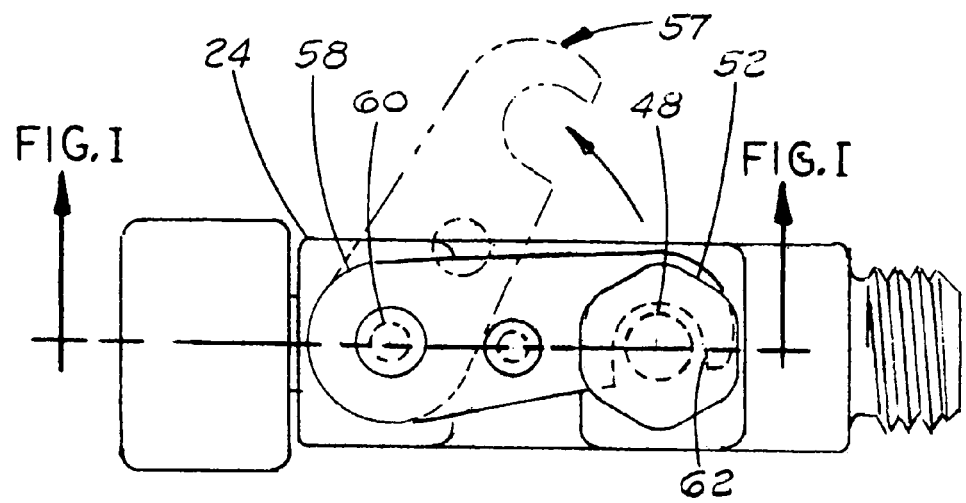
FIG. 2 is a detail view of a locking means in FIG. 1 preventing inadvertent operation of the invention.

For the ensuing description of the system lock 57 reference is made to FIG. 2, where there is shown a locking arm 58 consisting of an elongated flat member has one end rotatably mounted to a pin 60 affixed to and extending outwardly from the valve housing tube 24. The other or outer end of the arm 58 is formed into a hook 62. When it is decided to prevent inadvertent operation of 20. the relief valve assembly 10, the arm 58 is swung so that the hook 62 passes under the head 52 and lockingly engages the rod portion. When it is desired to operate the relief valve assembly, first the arm 58 must be swung out and away from assembly as shown in dash line depiction which frees the head 52 and rod portion 48 for movement.

Figure 3:
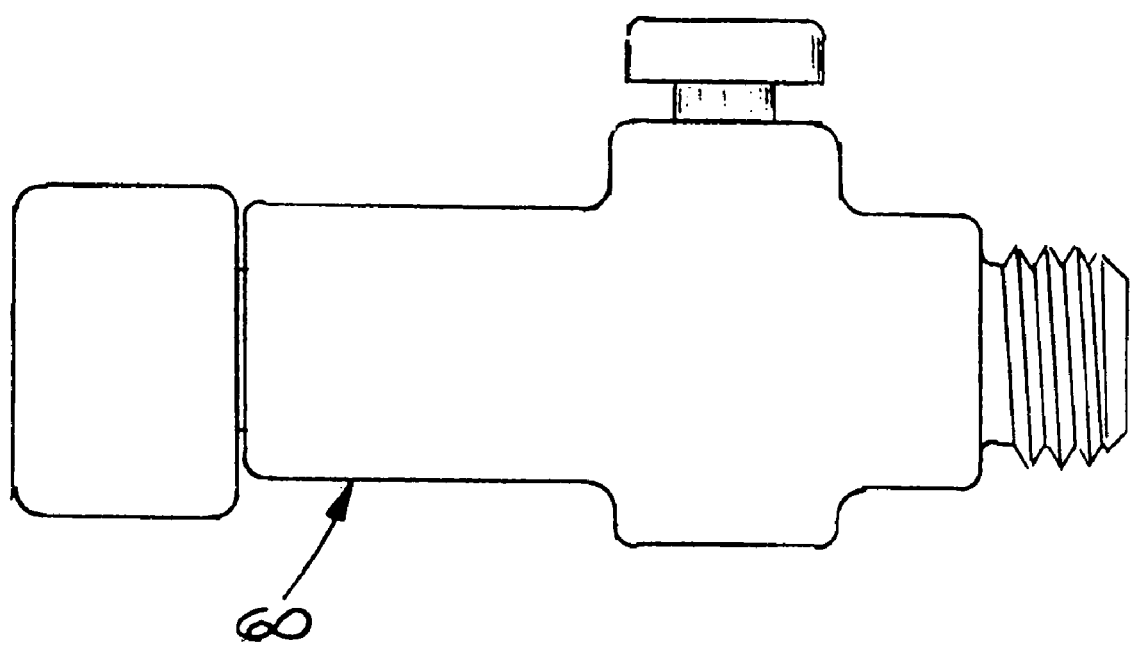
FIG. 3 is a second embodiment of the invention excluding a locking means.

The lock 57 as used in the first described embodiment of FIGS. 1 and 2 finds its most need when the source water has a pressure exceeding 40 psi. Where the water pressure is below 40 psi, there is lessened need for a lock such as lock 57. In the latter case reduction in manufacturing cost can be effected, in which case the overall assembly 60 can be made as shown in FIG. 3. It will be noted that the only difference in construction between the assembly 10 and assembly 60 is that the assembly 60 lacks a lock, such as the lock 57 in the first described apparatus. Otherwise 60 can be identical to 10.

Although the invention has been described in connection with a preferred embodiment, it is to be understood that those skilled in the appertaining arts may contemplate of changes that come within the spirit of the invention as disclosed and within the ambit of the appended claims. For example, the tapered head 52 may be threaded on the rod portion 48 instead of being integral therewith. In this latter case, the enlarged head 52 may be either unitary with the rod portion or threaded thereon.

What is claimed is:

1. A manually operated liquid pressure relief assembly for removable interconnection between a source of pressurized liquid and means for utilization of the pressurized liquid, comprising:
    a molded hollow tubular member having a first externally threaded end portion;
    a second end portion of the tubular member having a cylindrical recess formed in the outer surface of the member spaced inwardly from the second member outer end;
    a hollow cylindrical stub connector having a radially inwardly directed part at one end for threaded receipt within the recess of the tubular member;
    a resilient ring received over the outwardly facing surface of the stub connector;
    an interconnection means rotatably mounted onto the stub connector;
    a valving actuator having a tapered head at one end, an enlarged head at an opposite end, and a rod unitarily relating the tapered head and enlarged head to one another;
    the tubular member further including a first opening in a sidewall for sliding receipt of the actuator rod therein and a second opening in an opposite sidewall of the tubular member within which the tapered head is received and movable between blocking and unblocking conditions of the second opening;
    a first O-ring and a washer located within the tubular first opening, in the order given, with the O-ring at the deepest point within the opening;
    a second O-ring nested between the actuator tapered head and the walls defining the tubular member second opening; and
    a coil spring received on the rod with one end of the spring contacting the washer and the other end of the spring pressure contacting the enlarged head.

2. A manually operated liquid pressure relief assembly as in claim 1, in which there is provided a system lock including an arm rotatably mounted to the outer surface of the cylindrical tube and positionable in either a locking relation between the enlarged head and the cylindrical tube or to an unlocked position free from the enlarged head.

3. A manually operated liquid pressure relief assembly as in claim 1, in which the tubular member is constructed of molded polyurethane.

* * * * *